United States Patent [19]
Blaschke et al.

[11] Patent Number: 4,764,712
[45] Date of Patent: Aug. 16, 1988

[54] METHOD AND APPARATUS FOR OPERATING A FIELD-ORIENTED ROTATING-FIELD MACHINE SUPPLIED BY A CONTROLLED CONVERTER

[75] Inventors: Felix Blaschke; Leonhard Reng, both of Erlangen, Fed. Rep. of Germany

[73] Assignee: Siemens Aktiengesellschaft, Berlin and Munich, Fed. Rep. of Germany

[21] Appl. No.: 82,038

[22] Filed: Aug. 5, 1987

[30] Foreign Application Priority Data

Aug. 18, 1986 [DE] Fed. Rep. of Germany ....... 3627930

[51] Int. Cl.$^4$ ............................................. H02P 5/40
[52] U.S. Cl. .................................... 318/778; 318/805; 318/806; 324/158 MG
[58] Field of Search ............... 318/778, 798, 806, 803, 318/805, 807–811; 324/138 MG

[56] References Cited

U.S. PATENT DOCUMENTS 3,909,688 9/1975 Blaschke et al. ..................... 318/702
4,338,559 7/1982 Blaschke et al. ..................... 318/805

Primary Examiner—David Smith, Jr.
Attorney, Agent, or Firm—Kenyon & Kenyon

[57] ABSTRACT

In the field-oriented control of an asynchronous machine, the flux angle of which is calculated by a flux computer from the current and the voltage as the integral of the EMF, the correct flux vector must be available already at the start-up of the machine. For this purpose, one axis ($M\phi 1$) of a model coordinate system as well as the components ($iO^*$, $iM^*=0$), referred to the model coordinate system, of a vector parallel to this axis is determined at an input device (E1, E2) by a constant, given starting angle ($\phi MO^*$). This vector is transformed by means of the field angle ($\phi s$) calculated by the flux computer for forming the converter control variables into the stator coordinate system while the machine is excited but standing still. The angle deviation ($\phi MO^* - \phi s$) of the calculated field angle from the starting angle is used by a controller (CR) for correcting the calculated field angle. Before the setting device switches to the operationally provided reference value transmitter (RV), the calculated filed angle ($\phi s$) therefore assumes the starting angle ($\phi MO^*$) and the control device forces via the converter a stator current and machine flux parallel thereto. At the same time, also the parameter of the stator resistance used for calculating the flux can be adjusted.

7 Claims, 6 Drawing Sheets

METHOD AND APPARATUS FOR OPERATING A FIELD-ORIENTED ROTATING-FIELD MACHINE SUPPLIED BY A CONTROLLED CONVERTER

BACKGROUND OF THE INVENTION

The invention relates to a method for operating a field-oriented rotating-field machine supplied by a controlled converter.

In the following, the voltages or currents at the inputs of the rotating-field machine as well as the flux are designated by vectors with two defining quantities in a mathematical coordinate system. A stator coordinate system fixed in space which characterizes the stator winding has the Cartesian axes $\alpha 1$ and $\alpha 2$. A corresponding polar coordinate system describes a vector by the amount and direction ("angle"). For instance, the flux vector with the amount $\Psi$ and the angle $\phi s$ relative to the $\alpha 1$ axis in the Cartesian stator coordinate system by a pair of numbers $\underline{\Psi} = (\Psi \cos \phi s, \Psi \sin \phi s)$. By means of $\phi s$, the axis $\phi 1$ parallel to the field and the axis $\phi 2$ perpendicular to the field of a field coordinate system is then also fixed.

The correlation of the two defining quantities (components) of the current and voltage vector with the quantities appearing at three stator windings is accomplished by means of 2/3 and 3/2 converters, respectively. Angles are preferably likewise processed as unit vectors; for instance, the vectors $\underline{\phi s} = (\cos \phi s, \sin \phi s)$ is obtained for the field axis ($\phi 1$-axis) in the stator coordinate system. It can be calculated from the flux vector by a vector analyzer "VA". A vector can be transformed by means of a vector rotator "VD" from the stator coordinate system into the field coordinate system or vice versa, the required transformation angle, however, being equal to the field angle.

It is a feature of field-oriented operation of the preferably used asynchronous machine that the control input or reference values for the stator current vector according to FIG. 1, are set by a reference value transmitter RV as the vector $\underline{i\phi}^*$ in the field coordinate system and the converter with stator-oriented control variables which correspond to a control vector $\underline{is}^*$ and are brought to a value given by the control inputs by a current controller IR (individual controllers for the components of the vector or for the phase currents transformed into the three-system). A condition for the control is, however, that the vector difference to be eliminated is formed by vectors which are shown in the same respective coordinate system.

In the arrangement according to FIG. 1 at least the angle $\phi s$ is formed in the stator coordinate system from the current vector $\underline{is}$ and the voltage vector $\underline{us}$ by means of a flux computer FC. This can preferably be accomplished by the provision that the voltage vector $\underline{us}$, after deducting the ohmic drop $rs \cdot \underline{is}$ is vectorially integrated and the flux vector $\underline{\Psi s}$ is formed by deducting the integral inductive voltage drop $xs \cdot \underline{is}$ from which a vector analyzer VA calculates $\phi s$.

The field oriented control device VC operates here in the field coordinate system, where in the other switch position not shown in FIG. 1, of the switching device SW1 and SW2, the vector rotator VD1 transforms the stator current vector $\underline{is}$ into the field coordinate system (vector $\underline{i\phi}$) and the quantities formed by the current controller IR from the control deviations of the components are transformed by means of the vector rotator VD2 into components of the stator-oriented control vector $\underline{is}^*$ for addressing the control unit ST.

The flux computer FC which ultimately forms the flux $\Psi s$ as the integral of a corresponding vector $\underline{es}$ of the EMF operates satisfactorily only if at sufficiently high frequencies, the induced voltages are superimposed by relatively small disturbances. In addition, the integrators INT of the flux computer must be set to the value of the true flux components already when the machine is started up, if the advantages of field-oriented control are to be achieved.

It is known from European Patent No. E-B1-0015 501 to use for this purpose the setting means E1 and E2 shown in FIG. 1 as well as the switching device SW1 and SW2. Apparatus developed according to this principle for operating a rotating-field machine thus comprises a flux computer which calculates from the electrical measurement values of the machine, the field angle of the machine and thereby the direction angle of one axis of a Cartesian field coordinate system, and a control device with a setting input for the field angle, with means for presetting control variables for the components of the stator current vector in the field coordinate system, and with a transformation device which furnishes from the control quantities and the field angle, stator-oriented control quantities for the converter. For the start, a start input device is provided which presets by means of E1 an initial direction $\phi MO^*$ for the flux vector of the rotating field machine which replaces the field angle $\phi s$, and by means of E2, starting values $iO^* \neq 0$ and $iM^* = 0$ for the control quantities $i\phi 1^*$ and $i\phi 2^*$ of the vector $\underline{i\phi}^*$. The switching device connected to the flux computer, the control device and the start input device releases, in preparation of starting the machine, the starting direction and the starting values and blocks them in order to release the starting of the machine.

The procedure here is as follow:

(a) in a first step, with the machine standing still, the starting angle $\phi MO^*$ is set-in which determines the direction of a model flux vector and an axis $M\phi 1$ of a model coordinate system parallel thereto. Further preset are the input variables $iO^* \neq 0$ and $iM^* = 0$ which thus preset an input vector which is thus parallel to $M\phi 1$, is designated with $\underline{iO}^*$ and which is transformed by means of transformation angle derived from the starting angle, namely, the starting angle $\phi MO^*$ itself, into the vector $\underline{is}^*$, i.e. into the stator-oriented control quantities for the converter. During this time, the line switch SWN is closed so that the electronic control circuitry is connected to voltage while the converter itself is still blocked by the open switch SWS. The first step ends with the closing of SWS, whereby the converter is released for exciting the machine.

(b) In a second step, the converter is now controlled by the stator-oriented control variables which in this step determine a constant current vector $\underline{is}^*$, so that a constant flux which is defined by the direction of $\underline{is} = \underline{iO}^*$ and points in the direction of $M\phi 1$ or $\phi MO^*$ is being built up in the machine, for the true field angle $\phi 0$ of which the value $\phi s$ is calculated from corresponding electrical parameters fixing the field angle of the machine. This calculated field angle $\phi s$ then fixes a field coordinate system coinciding with $M\phi 1$ and $M\phi 2$. (FIG. 2)

(c) In a last step a switching operation is then performed by the control vector $\underline{iO}^*$ to control variables $i\phi 1^*$, $i\phi 2^*$ of the vector $\underline{i\phi}^*$ depending on the operation, and the control variables are transformed into the stator-oriented control variables $\underline{is}^*$ for the converter by means of the calculated field angle $\phi s$. The machine then starts up in normal operation.

This method eliminates the mentioned disadvantages only if the flux computer images the true field angle $\phi 0$ also correctly into the calculated field angle $\phi s$. This, however, is not assured.

SUMMARY OF THE INVENTION

The invention therefore provides a controller which can be activated at least ahead of the start-up, to which the direction angle $\phi s$ taken off at the flux computer and, at the reference value input, the starting direction $\phi MO^*$ released by the start input direction can be fed, and the output signals of which can be fed back to the input of the flux computer in order to intervene with a correction when the direction angle $\phi s$ is calcuated. Furthermore, measures for controlling the converter output current prior to the start are provided by which the starting values for the input variables are transformed by means of the corrected direction angle into the stator-oriented control variable.

Accordingly, the calculated field angle $\phi s$ is slaved in the second step to the predetermined starting angle $\phi MO^*$ by controlling the angle deviation $\phi MO^* - \phi s$ and the calculated field angle is used as the transformation angle for converting the control variables into the stator-oriented control variables. Advantageous further embodiments of this method and this apparatus are described below.

DETAILED DESCRIPTION OF A PREFERRED EMBODIMENT OF THE INVENTION

Figure 1:
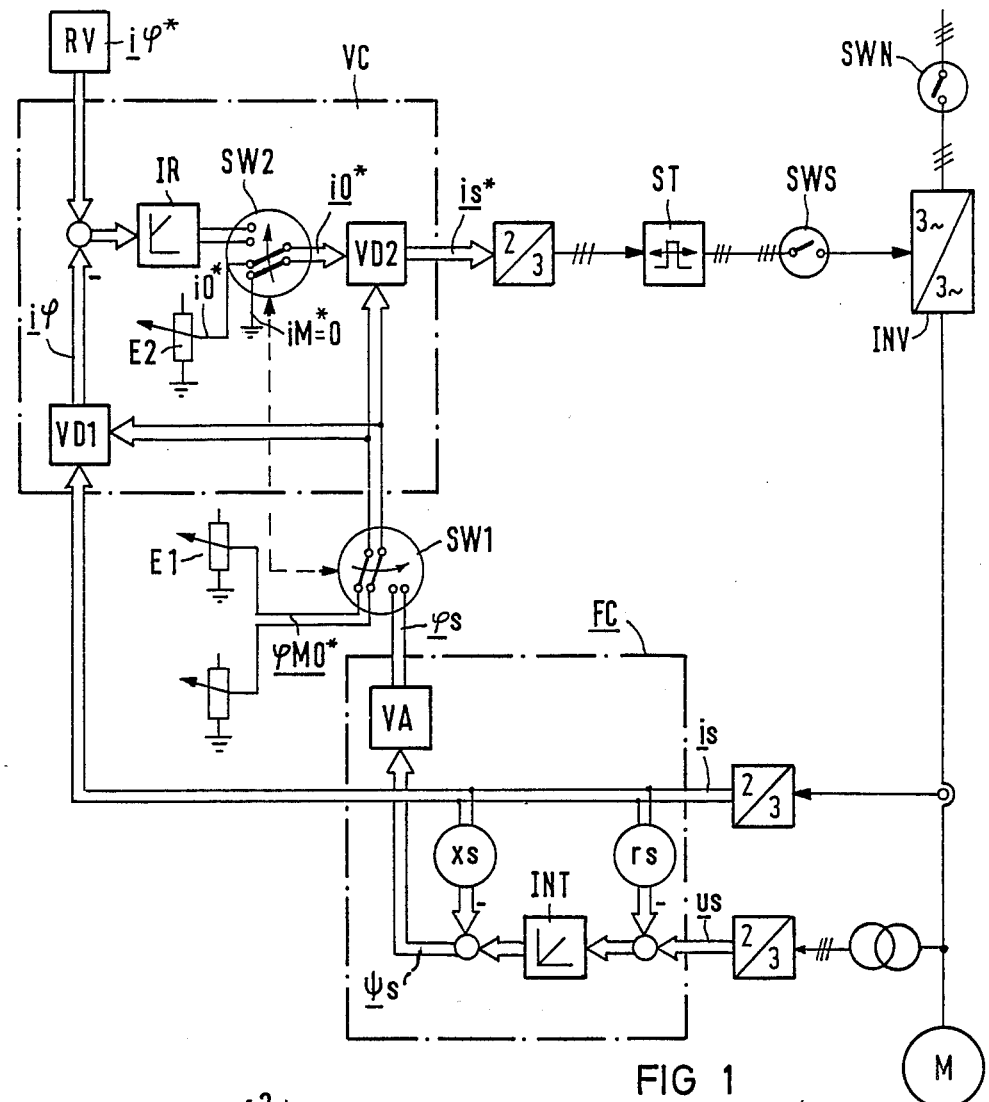
FIGS. 1 and 2 show the already mentioned device derived from the state of the art and the coordinate presentation of the current flowing in the second step.
Figure 2:
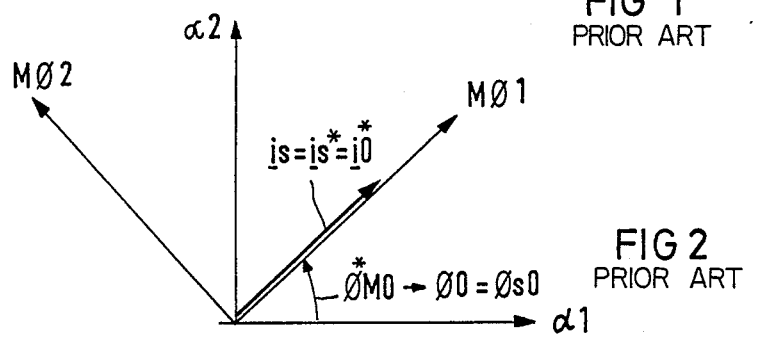
Figure 3:
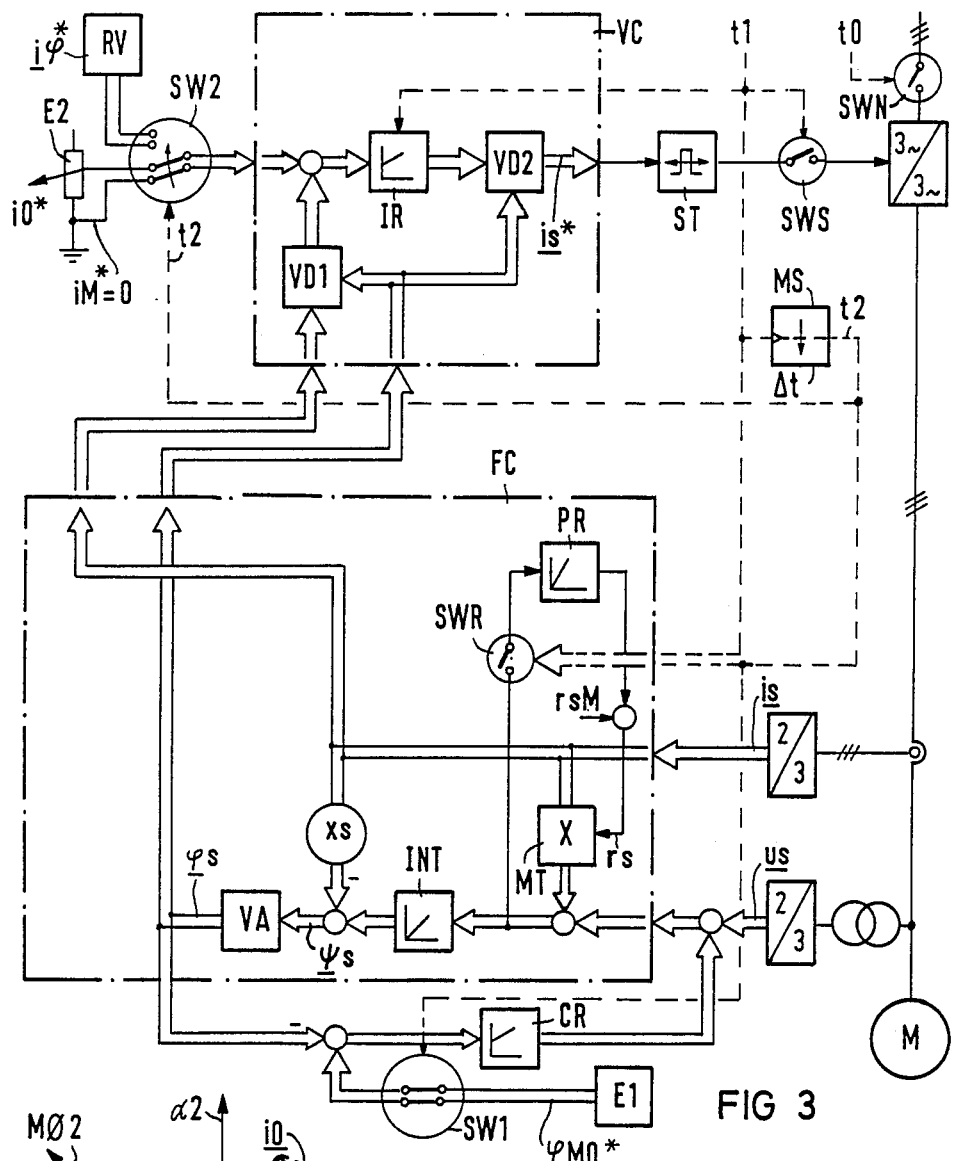
FIGS. 3 and 4 show a device and the corresponding vector presentation of the current according to the invention.

In the device according to FIG. 3, all switches are intially in the rest position shown. At the time tO the grid switch SWN is switched on while the converter, with the switch SWS open, remains blocked. The flux computer FC therefore picks up at its inputs for the electrical quantities the value zero. Since however, it is fed the vectorial angle difference $\phi MO^* - \phi s$ via a feedback line with the controller CR, the calculated field angle $\phi s = \phi MO^*$ is present at the output of the flux computer if the angle $\phi MO^*$ is taken off at the input device E1 via the closed switch SW1. This angle fixes the axes $M\phi 1$ and $M\phi 2$ according to FIG. 4.

Contrary to the state of the art, the calculated angle $\phi s$ is fed to the field-oriented control device so that the vector $\underline{iO}^*$ taken off at the setting device E2 by means of the switch SW2 has, in the $M\phi 1, M\phi 2$ system, the components $iM\phi 1^* = iO^*$ and $iM\phi 2^* = iM^* = 0$), i.e., it has at the time $t=tO$, the direction $M\phi 1$ given by $\phi s = \phi MO^*$ and the magnitude $iO^*$.

By closing SWS, a closed control loop with a steady state can be obtained in which the stator current $\underline{is}$ is equal to the vector $\underline{iO}^*$ by controlling (current controller IR) its components (vector rotator VD1) transformed into the $M\phi 1, M\phi 2$ system, where the output signals corresponging to the control differences of the component, of the current controller represent, after having been transformed back into the stator reference system, the components of the control vector $\underline{is}^*$.

During the first step, however, the control loop is not closed (switch SWS open), and the converter and the stator current are therefore blocked ($\underline{is} = 0$). The current controller therefore furnishes a maximum reading or it is kept at the output value zero by an inactivation signal. If in the latter case the controller is released at the time t1 and the converter has been fired by closing SWS with the firing angle settings given by $\underline{is}^*$, then the stator current $\underline{is}$ flows in the direction given by $\phi MO^*$ and a magnitude running up to iO.

Figure 4:
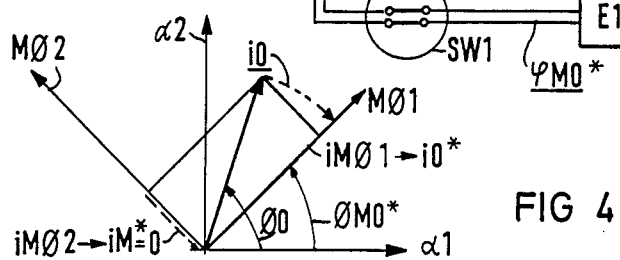

It is frequently simpler when SWS is closed, to fire a fixed predetermined combination of thyristors in the converter. In this case, or if the current controller output causes a control vector $\underline{is}^* \neq 0$ at the time of the converter firing, any actual stator current $\underline{iO}$ begins to flow which is leveled out only in the course of the second step to $\underline{iO} = \underline{iO}^*$. This is shown in FIG. 4 where, for the sake of clarity a random starting angle $\phi MO^*$ is assumed. In practice, $\phi MO^* = 0$ will advantageously be chosen, i.e., the model coordinate system $M\phi 1, M\phi 2$ coincides with the stator coordinate system $\alpha 1, \alpha 2$.

In the second step, in which because of the flowing current, a flux is generated which is parallel to the flowing current because the machine is standing still, the flux converter now calculates a flux angle $\phi s$ which therefore does not of necessity coincide with $\phi MO^*$. Initially it also does not correspond to the true flux angle $\phi 0$; it is rather slaved by the action of the controller CR to the value $\phi MO^*$ ($\phi s - \phi MO^* \rightarrow 0$). Since this slaved angle $\phi s$ is equal to the direction of the vectors $\underline{is}^*$ or $\underline{is}$, respectively, the true field angle $\phi 0$ assumes at the end of the second step the value $\phi s \rightarrow \phi MO^*$ because the current and the flux are parallel when the machine is standing still.

Now, a transition can be made at the time t2, for instance, at the end of a preparation time $\Delta t$ set at a monostable multivibrator stage, by switching the switches SW1 and SW2, as in the state of the art, in which the current is controlled in accordance with the control quantities predetermined by the reference value transmitter RV in dependence on the operation, and the machine starts up.

In principle, only the slaving of the transformation angle $\phi s$ caused by the controller CR, is necessary but not a current control, i.e., a control comparison of the current components. For instance, the control inputs $iO^*$ and $iM^* = 0$ can be set directly into the vector rotator VD2 instead of the IR output singals (controlled operation).

Neglecting transient states and considering only the fundamentals, the EMF vector is perpendicular to the flux vector. During the second step, the component $eM\phi 1$ of the EMF vector pointing in the direction $\phi MO^*$ of the axis $M\phi 1$ will therefore have to assume the value zero; because the machine is standing still, an inductive component of the EMF also no longer occurs.

For the EMF calculated in the flux computer from the current, the voltage and the machine parameters rs, one therefore obtains a condition which is fulfilled only if the correct parameter value is used and is therefore used for the identification and readjustment of the stator resistance parameter. If, in particular, $\phi MO^*$ is set equal to 0°, and therefore $eM\phi 1 = e\alpha 1$, one therefore obtains:

$$u\alpha 1 - rs \cdot i\alpha l = 0$$

and, according to FIG. 3, the corresponding EMF component is taken off at the input of the integrator INT in the second step by closing the switch SWR and is fed in a parameter controller PR. By means of the controller output variable, a preset estimated value rsM is corrected until the gain rs generated thereby at the multiplier member MT of the flux computer furnishes the stator voltage drop rs. $\underline{is}$ compensating the stator voltage $\underline{us}$.

This a particularly simple utilization of the fact that in case of an asynchronous machine which is standing still and through which d-c current flows, the integrand must become zero in the flux equation $\underline{\Psi s} = \int (\underline{us} - rs \cdot \underline{is})dt - xs \cdot \underline{is}$.

Figure 5:
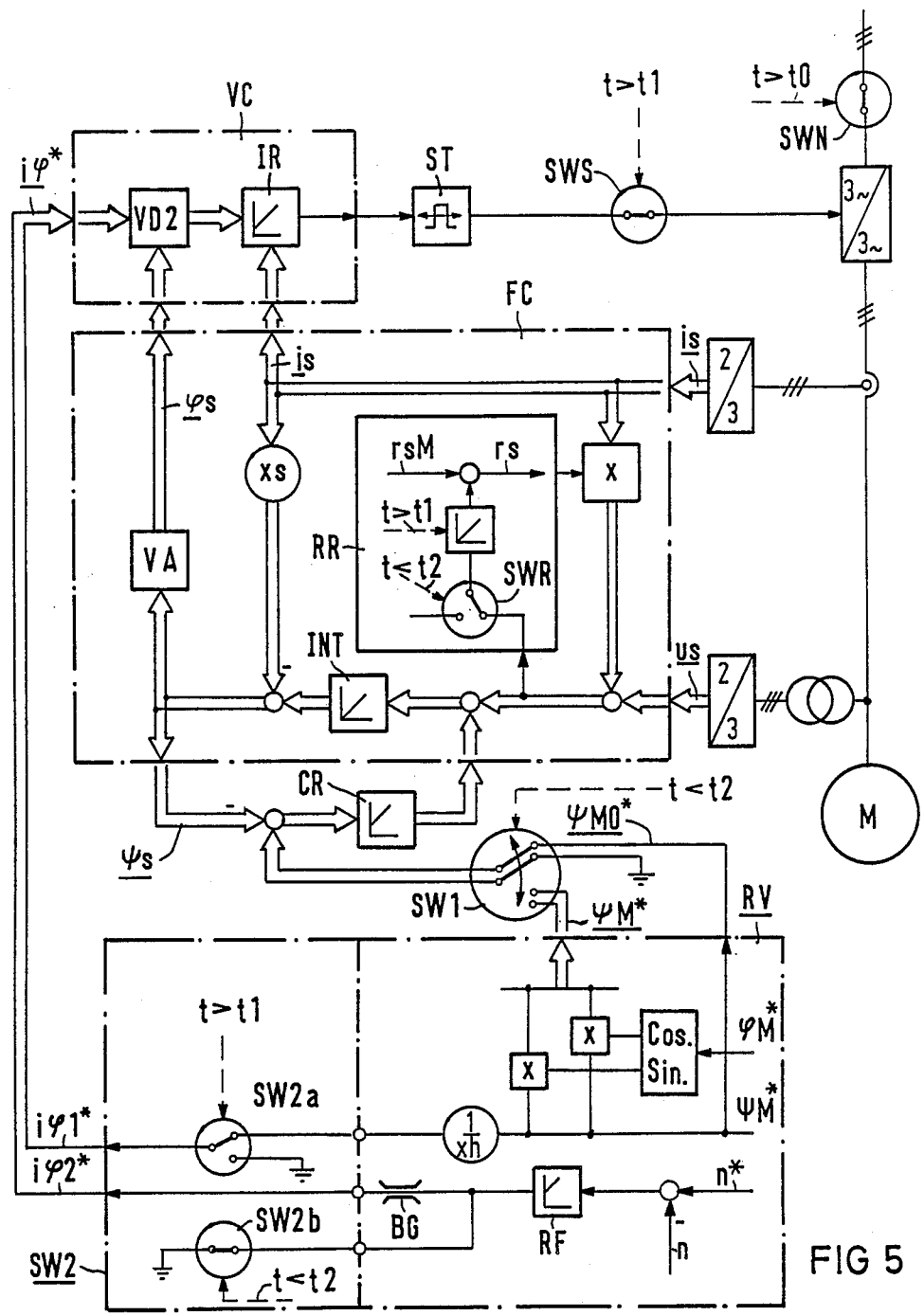
FIG. 5 shows a different advantageous embodiment of the device.

In FIG. 5, this control shown a a block RR is effective only during the second step.

Deviating from FIG. 4, it is provided that the field-oriented control device VC operates in the stator coordinate system, i.e., the control vector $\underline{i\phi^*}$ is transferred in the case shown by means of the vector rotator VD2 and the transformation vector $\phi s$ representing the transformation angle $\phi s$ into the stator coordinate system. In this coordinate system, the current controller then levels out the stator components; it needs to contain therefore in the simplest case only a 3-2 converter in addition to two current component controllers in order to supply control variables for the control unit ST.

While according to FIGS. 3 and 4, only the direction vector for the computed field angle $\phi s = \tan^{-1}(\Psi \alpha 2/\Psi \alpha 1)$ is readjusted in accordance with the corresponding vector $\phi MO^*$ for the axis $M\phi 1$ given by $\phi MO^*$, FIG. 5 shows that advantageously also the magnitude belonging to the flux vector $\Psi s$ is slaved by a preset amount $\Psi M^*$ for the model flux vector. The model flux vector can therefore be set-in, in the stator coordinate system, by the two Cartesian components $\Psi M^* \cdot \cos \phi MO^*$ and $\Psi M^* \cdot \sin MO^*$, where $\phi MO^*$ is advantageously set $\phi MO^* = 0°$. The controller CR then controls the control deviation of the vector components.

Advantageously, this amount $\Psi M^*$ is further set equal to the reference value of the flux provided for the operational start-up. If now, corresponding to the main field inductance xh, the control input $iO^*$ required in the second step is chosen to be $\Psi M^*/xh$, the reference value for the stator current building up the flux, then, on the one hand, the reference value for the stator current building up the flux is matched to the flux determined by the flux computer, and the outputs of the integrators INT are set to the correct value not only with respect to its quotient, but also with respect to their individual amplitudes. If secondly, the machine is started up in the second step, the control input $i\phi 1^*$ which determines the flux of the machine has already the correct value. If now the control variable $i\phi 2^*$ at the output of a frequency control RF for the control deviation of the mechanical rotor frequency, the stator frequency or the flux frequency is released via a start-up generator or another device BG limiting the rate of rise, no step-wise change takes place at the outputs of the current controller IR and the integrators INT.

For this purpose, two individual switches SW2a and SW2b are provided as the switch SW2 which, during the first step, keep the two control inputs of the vector $i\phi^*$ at the value zero. With the switch SWS open (machine not excited), the current controller IR is therefore not active. In the second step, while the switch SW2a is switched over and releases the value $\underline{i\phi 1^*} = \Psi M^*/xh$ derived from the magnitude of the flux-control input $\Psi M^*$, the individual switch SW2b sets $i\phi^*$ to the value zero as before.

In the third step, in which the frequency control RF and the start-up transmitter BG is now released, it is further advantageously provides to disengage the model vector $\Psi MO^*$ by switching the switch SW1 to one input for a flux control vector $\underline{\Psi M^*}$. The magnitude of this control vector $\underline{\Psi M^*}$ is formed again from the value $\Psi M^*$ predetermined for the second step; however, it is assumed here that a control angle $\phi M^*$ given by operating parameters is available which reproduces the mean value of the two flux angles with sufficient accuracy. In the stator coordinate system, the the flux control vector $\underline{\Psi M^*}$ is therefore formed by its components $\Psi M^* \cdot \cos \phi M^*$ and $\Psi M^* \cdot \sin \phi M^*$.

Thereby, zero-point deviations which are generated during the start-up by drift of the integrators or other disturbances, can be averaged out. The flux computer FC is therefore leveled out by $\Psi M^*$ with respect to the long-term average value for the calculated flux vector $\Psi s$ to $\Psi M^*$, it makes available, however, a correspondingly fast-changing transformation angle for fast dynamic changes of the field-oriented control device VC.

A similar switching action is also performed by the switch SWR which can feed to the parameter controller PR during the second phase the control deviation $u\alpha | -rs \cdot i\alpha|$ and in the second step, a control deviation formed from other operating variables for correcting the stator current resistance.

Figure 6:
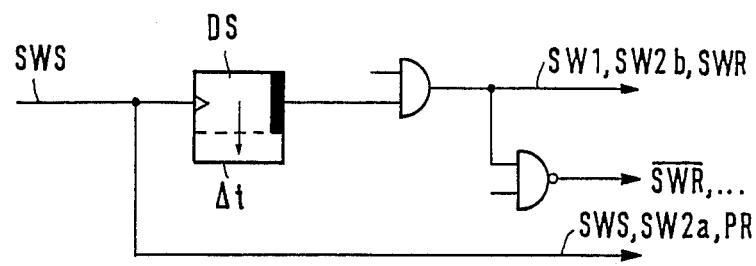
FIGS. 6 and 7 show the control in time for the used switching device and the signals formed.
Figure 7:
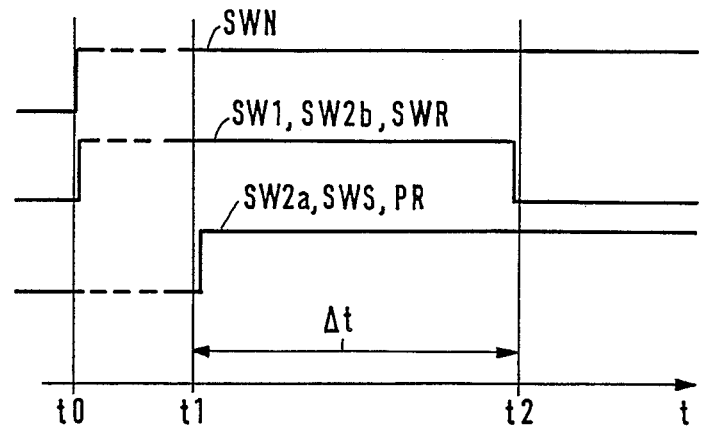

In FIG. 5 it is indicated for the switch positions shown at which times they are held in this position via their addressing signals. This is achieved by a time control according to FIG. 6, and its output signals shown in FIG. 7. The instant t0 at which the supply voltage of the converter and the electronic circuitry is switched on by closing SWN and at the same time, a dynamic storage device DS is set as well as the instant t1 at which the converter is started up by closing SWS, are preset by respective external operating signals. The dynamic storage device DS maintains its state after being addressed by the switching flank of the switching signal for SWS also still for the preparation time $\Delta t$ and thereby triggers the release of the operationally predetermined control inputs for $i\phi^*$ only at the time $t2 = t1 + \Delta t$. In the case of drives with several motors, for instance, provision can be made to release the output signal finally only when an external release signal occurs.

Figure 8:
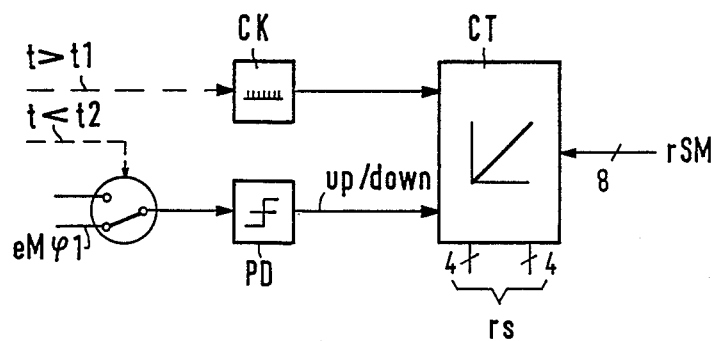
FIG. 8 shows a parameter controller.

The resistance control RR can contain advantageously, according to FIG. 8, a digital integrator (counter CT) which is set in the first step to an estimated resistance parameter rsM. At the instant t1, the pulses of a clock CK (for instance, about 50 Hz) are released and counted by the counter CT where the singal sign $(u\alpha | -rs \cdot i\alpha|)$ is fed by a polarity detector PD to the forward/backward input of the counter CT.

Figure 9:
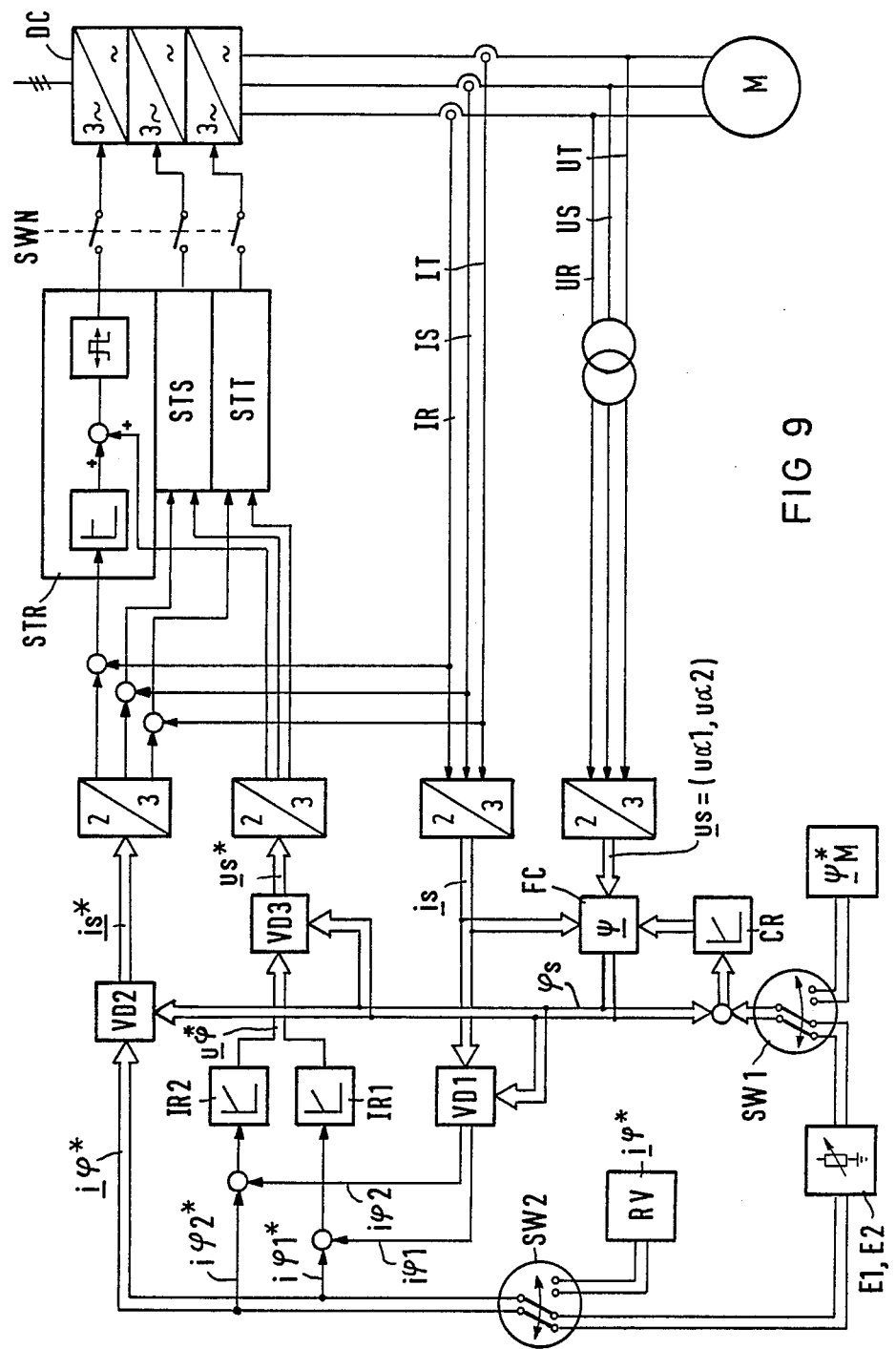
FIG. 9 illustrates the schematic use of the invention in a direct coverter.
Figure 10:
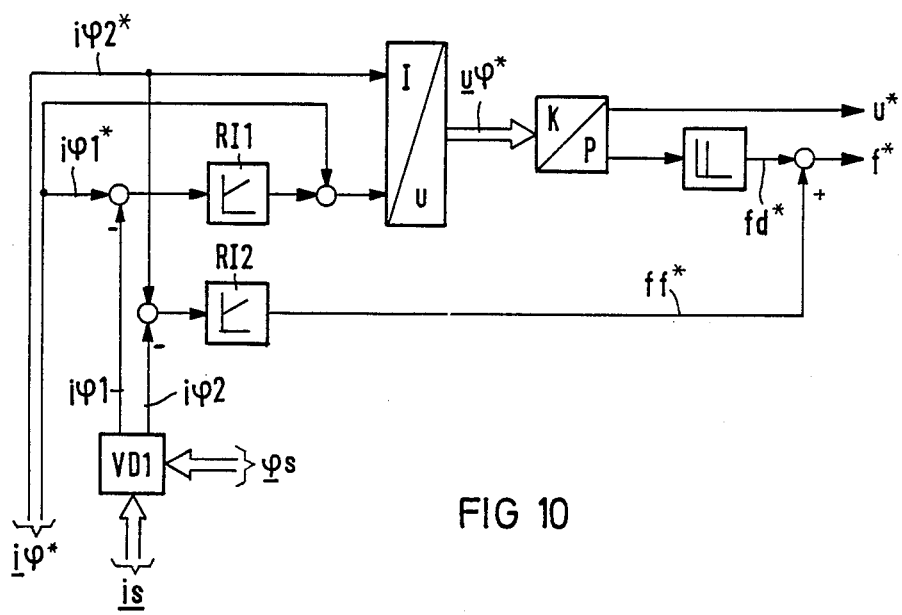
FIGS. 10 and 11 show a field-oriented control device for converters with a control input for the converter frequency.
Figure 11:
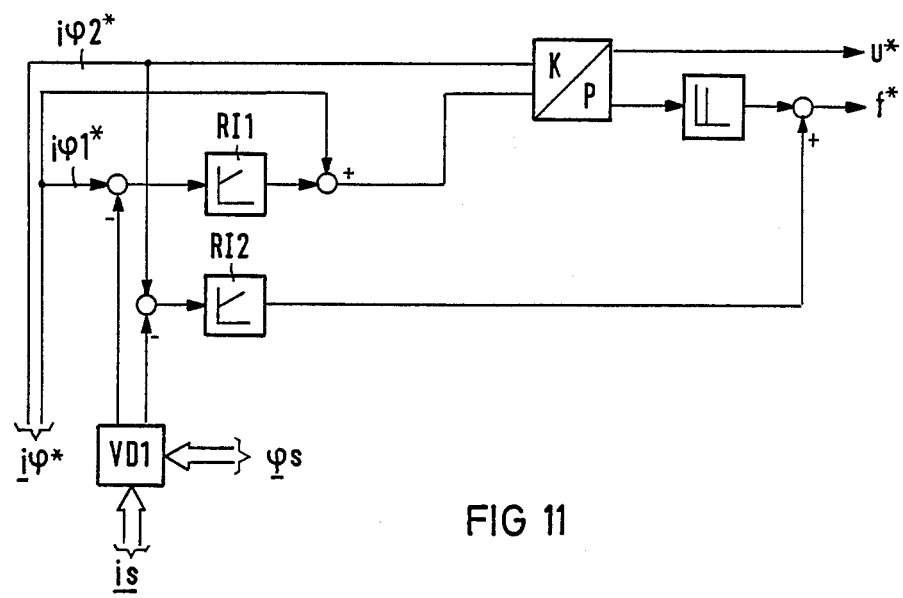

The following FIGS. 9 to 11 show the application of the invention to various converter types. Thus, for supplying a direct converter DC according to FIG. 9, there can be formed in the field coordinate system by means of the current component controllers IR1 and IR2, a voltage reference vector $\underline{u}\phi^*$, which together with the reference vector $\underline{i}\phi^*$ is transformed into the stator coordinate system, where both vectors are transformed into corresponding voltage and current reference values for the converter output phases. The control units STR, STS and STT associated with individual phases superimpose on the voltage reference value a correction value formed from the control deviation of the phase current in order to assure that the direct converter always furnishes that phase voltage, for which the phase current adjusts itself with as little delay as possible to the reference values which are specified by the control inputs $i\phi1^*$ and $i\phi2^*$. Thereby, the decoupling typical for field orientation is assured, at which the components parallel to the field and perpendicular thereto of the actual current system can be adjusted by appropriate reference values $i\phi1^*$ and $i\phi2^*$ independently of each other.

For voltage-impressing converters with an input for a frequency control quantity $f^*$ and an amplitude control variable $U^*$, the filed-oriented control device shown in FIG. 10 can be used, in which the desired decoupling is achieved by a decoupling network I/U which is calculated from the output signal of the controller RI1 lead by the reference value $i\phi1^*$ and the control input $i\phi2^*$. A Cartesian/polar coordinate converter forms the amplitude coordinate $U^*$ as the amplitude control input, while a dynamic frequency $fd^*$ picking up any fast change of the reference vector is formed from the angle coordinate by means of a differentiator. With this dynamic frequency, the frequency value $ff^*$ is corrected which is taken off at a controller RI2 for the current component perpendicular to the field, since the current amplitude is practically already compensated by the amplitude control quantity $U^*$, RI2 thus controls the phase of the current system; the control therefore operates, so to speak, in a polar field coordinate system.

If a current-impressing converter with a frequency control input is used, a decoupling network can be omitted (FIG. 11).

With respect to the vector rotator VD1 (transformation into the field coordinate system), reference is made to FIG. 5, according to which the vector difference of the current to be controlled need not be realized in the field coordinate system.

The above described preferred embodiment of the invention is meant to be representative only, as certain changes may be made therein by those skilled in the art without departing from the clear teachings of the invention. Accordingly, reference should be made to the following appended claims which alone define the invention.

What is claimed is:

1. A method for operating a field-oriented rotating-field machine supplied by a converter, said converter being controlled by stator-oriented control variables and said stator-oriented control variables being derived by angular transformation of a control vector, wherein:
   (a) during a first time period, with the machine in a stand still state,
      a starting angle to define a model coordinate system and starting control variables to define said control vector parallel to one axis of said model coordinate system are generated,
      said starting control variables are transformed into said stator-oriented control variables by use of a transformation angle corresponding to said starting angle, and
      the converter is released to excite said rotating-field machine,
   (b) during a second time periode, with the machine essientially still in the stand still state,
      a calculated field angle is generated by calculating from measured electrical quantities of the machine a flux vector angle value and compensating the deviation between said starting angle and said calculated flux vector angle, and
      said starting control variables are transformed into said stator-oriented control variables by use of said calculated field angle,
      the converter already being controlled by said stator-oriented control variables, and
   (c) during a third time period, determination of said control vector is switched from said starting control variables defining the control vector parallel to said model coordinate system to operation control variables defining the components of the current vector of the machine in a coordinate system oriented to the calculated field angle, in order to starting up the machine.

2. The method according to claim 1, further characterized by impressing the direction of the calculated field angle on the stator current vector during said second time period by use of a current controller.

3. The method according to either claim 1 or 2, wherein during said first time period, the converter is relesed independently of the value of the stator-oriented control variables.

4. The method according to either claim 1 or 2 wherein, during said first time period, a magnitude of the stator current vector corresponding to the desired value of the flux vector when the machine is being started up is transferred to the starting control variables and during said second time period, said calculated field angle is derived from a field vector signal, said field vector signal being generated by calculating from said measured electrical quantities a calculated flux vector and compensating the vector deviation between said calculated flux vector and a model flux vector given by said starting angle and said desired value of the flux vector.

5. The method according to either claim 1 or 2, wherein
   (a) during said second time period, a vector for the EMF of the rotating field machine is calculated from said measured electrical quantities and a machine parameter; said calculated EMF vector being used to calculate the field angle; and
   (b) during said second time period, the machine parameter is changed until the component of the calculated EMF vector which is parallel to an axis of the model coordinate system defined by said starting angle becomes zero.

6. An apparatus for operating a rotating-field machine (M) supplied by means of a converter (INV), which comprises:
   (a) a flux computer (FC) operable to calculate from electrical measurement values (us, is) obtained from said rotating-field machine the field angle ($\phi s$) of the machine which determines the direction of one axis of a Cartesian field coordinate system ($M\phi1, M\phi2$),
   (b) a control device (VC) including a setting input to receive the field angle ($\phi s$), means for receiving control inputs (i$\phi$*) for the components of a stator current vector in the field coordinate system and a transforming device (VD1, VD2) to transform said control inputs by rotation through said field angle from said field coordinate system to stator-oriented control quantities (is*) for the converter;

(c) a start input device (E1, E2), to generate and trasnmit to the control device a starting direction ($\phi$MO*) for the flux vector of the rotating-field machine and start control inputs (iO*, iM*=0) for start control variables, and (d) a switching device (SW1, SW2) connected to the flux computer, the control device and the start input device and operable to release the starting direction ($\phi$MO*) and the start control inputs (iM*=0) prior to start up of said rotating-field machine and block the start-up of the rotating field machine, characterized by (e) a controller (CR) controllably operable at least prior to start-up of the rotating-field machine, and including an actual-value input to receive the calculated field angle ($\phi$s) from the output of the flux computer, a reference-value input to receive the starting direction generated by the start input (E1) and an output means to form a feedback loop with said flux computer to provide a correction variable to the input of the flux computer (FC) utilized in calculating a corrected field angle, and (f) means for controlling the converter output current prior to the start-up of the rotating-field machine which transform the start control inputs into the stator-oriented control variables by means of the corrected field angle.

7. The apparatus according to claim 6, wherein the flux computer (FC) includes an arithmetic circuit for forming the EMF vector of the rotating-field machine from the voltage and the current of the stator winding and an adjustable machine parameter (rs), two integrators (INT) for the components of the EMF vector, from which the stator-oriented Cartesian components of the flux vector are derived, and a null controller (PR) to control the component of the EMF vector pointing in the starting direction by changing the adjustment of the machine parameter to zero.

* * * * *